INVENTORS
NEAL I. PAULSEN
STANLEY C. RUSTAD
PETER SMIRNOW
HENRY E. WISSMAN
BY Kenneth D. Ohm
ATTORNEY INVENTORS
NEAL I. PAULSEN
STANLEY C. RUSTAD
PETER SMIRNOW
HENRY E. WISSMAN
BY Kenneth D. Ohm
ATTORNEY INVENTORS
NEAL I. PAULSEN
STANLEY C. RUSTAD
PETER SMIRNOW
HENRY E. WISSMAN
BY Kenneth D. Ohm
ATTORNEY INVENTORS
NEAL I. PAULSEN
STANLEY C. RUSTAD
PETER SMIRNOW
HENRY E. WISSMAN
BY Kenneth D. Ohm
ATTORNEY United States Patent Office 3,527,635
Patented Sept. 8, 1970

3,527,635

APPARATUS FOR DISPENSING MEASURED LENGTHS OF TAPE AT REGULAR TIMED INTERVALS

Neal I. Paulsen, Stanley C. Rustad, Peter Smirnow, and Henry E. Wissman, Minneapolis, Minn., assignors to General Mills, Inc., a corporation of Delaware Filed Jan. 27, 1967, Ser. No. 612,221
Int. Cl. B32b *31/00;* B65h *25/00*
U.S. Cl. 156—361 18 Claims

ABSTRACT OF THE DISCLOSURE

An apparatus having a tape supply reel, a drive system to pull the tape from the supply reel, and means to guide the tape. The drive system has an index drive assembly with its input driven in synchronism with a device which intermittently passes items, upon which a predetermined measured length of tape is to be placed, through a tape receiving station. The index drive assembly feeding a predetermined length of tape into position for placement on each item passed through the tape receiving station and only providing motion to the tape when an item to have tape applied thereto is not in position to receive the tape. A knife to cut off a predetermined length of the tape as soon as the index drive assembly causes the tape to stop moving after such predetermined length of tape has been placed in position for placement on an item to be taped.

One object of the present invention is to provide an apparatus which dispenses measured lengths of tape at predetermined intervals.

Another object of this invention is to provide an apparatus which dispenses measured lengths of tape at predetermined intervals at maximum rates well over 75 pieces or lengths of tape per minute.

A further object of this invention is to provide an apparatus which dispenses predetermined measured lengths of tape at predetermined intervals and which is capable of skipping any particular dispensing cycle in case there is no need to dispense to predetermined measured length of tape during such cycle.

Figure 2:
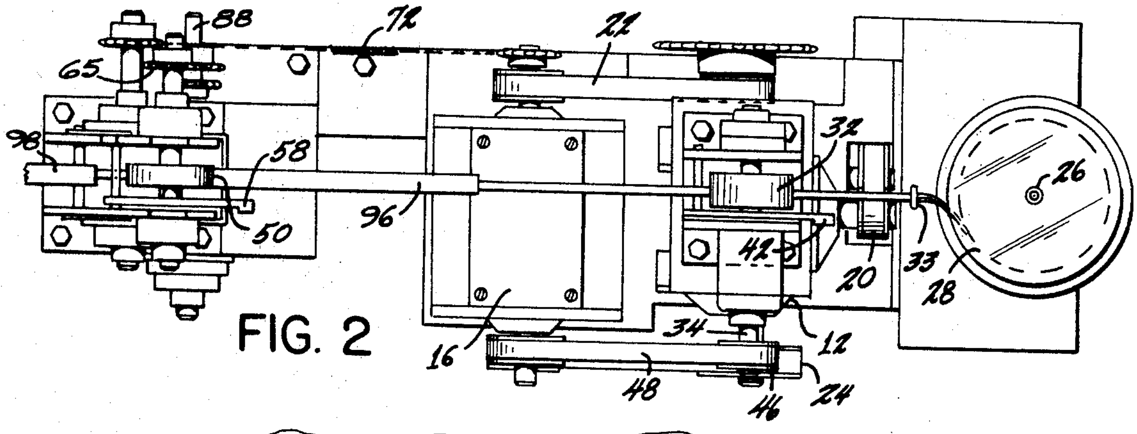
Figure 3:
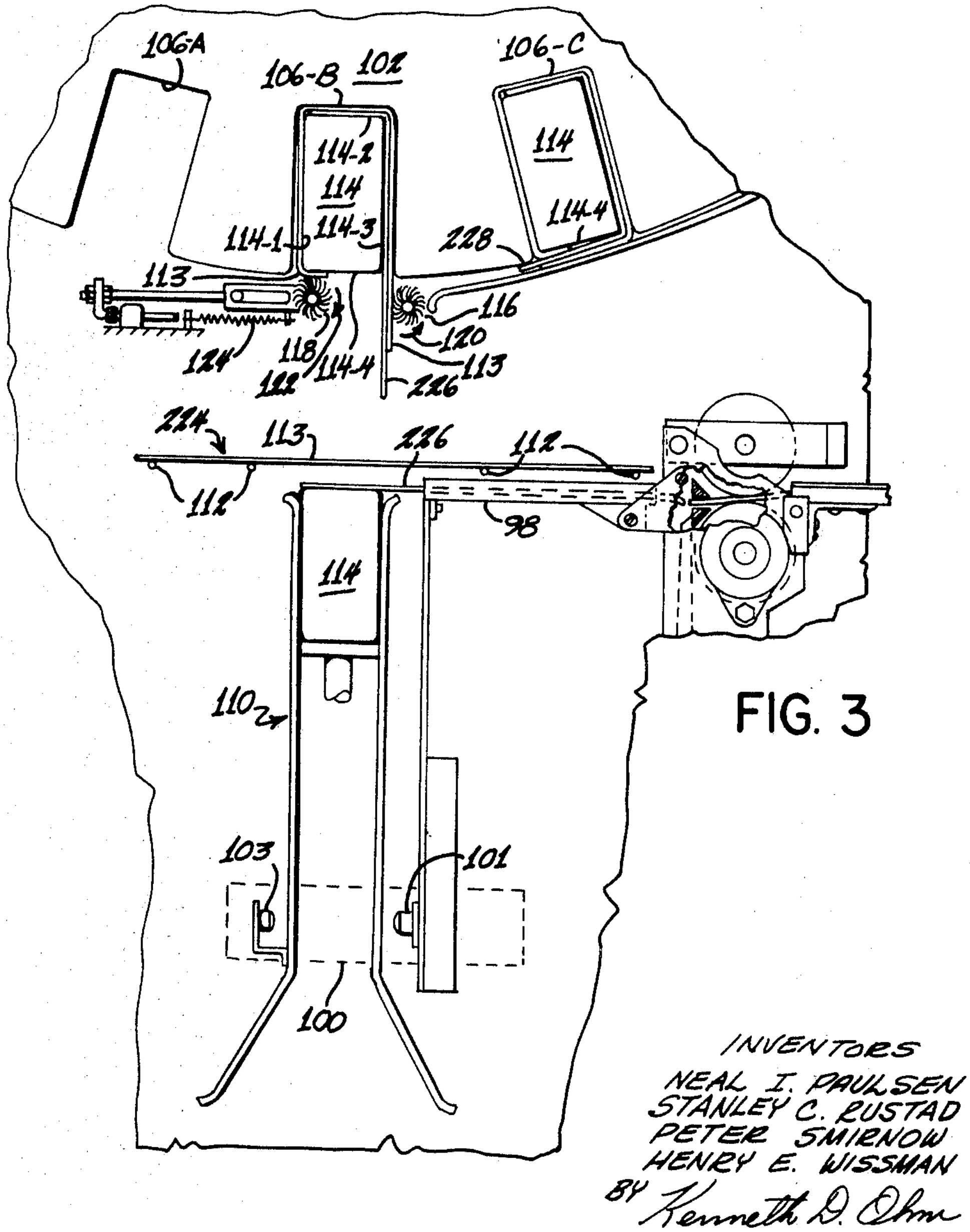
Figures 5, 6:
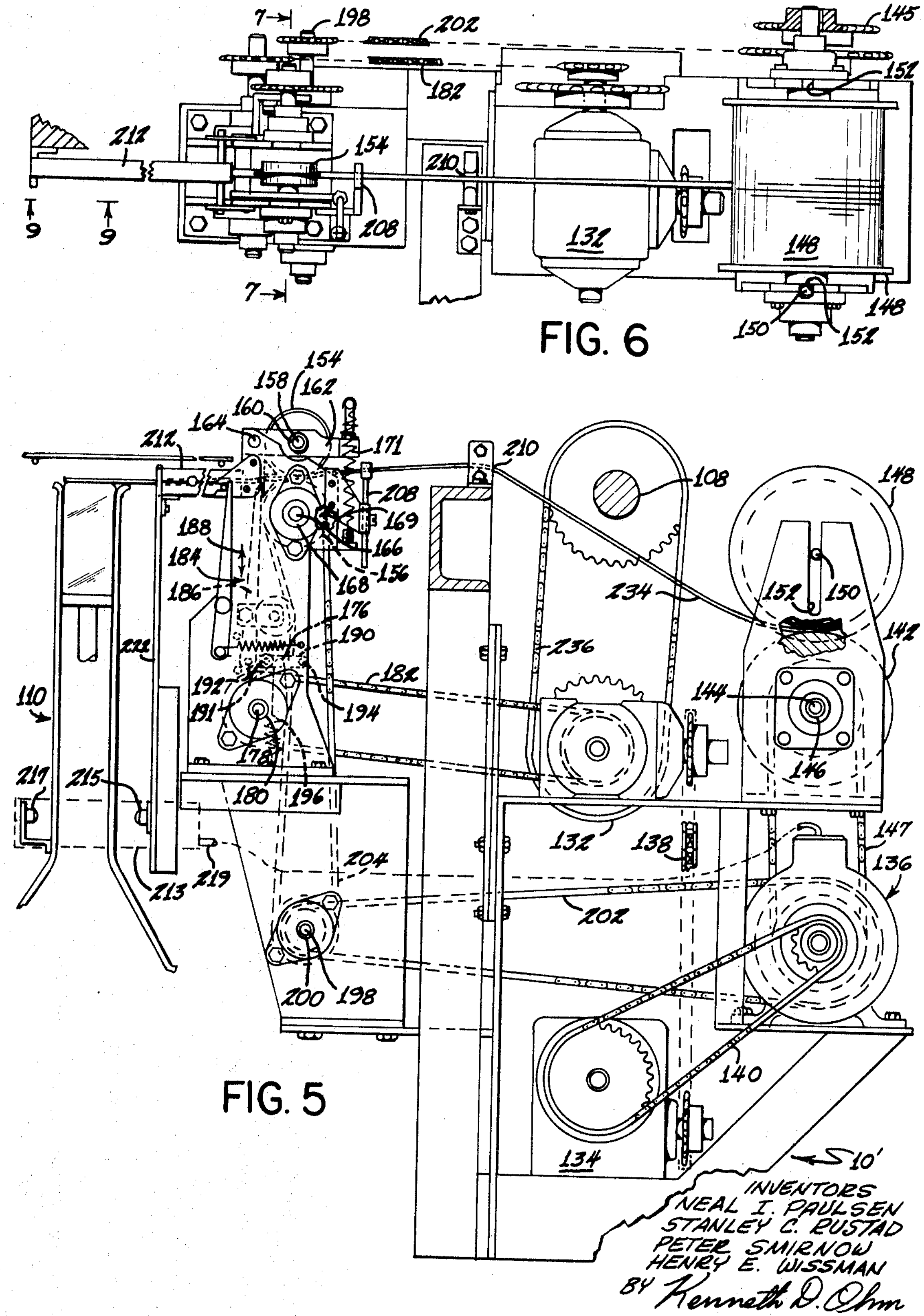
Figure 8:
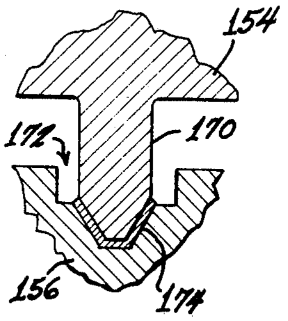
Figure 10:
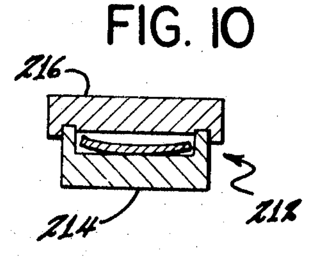
Figure 7:
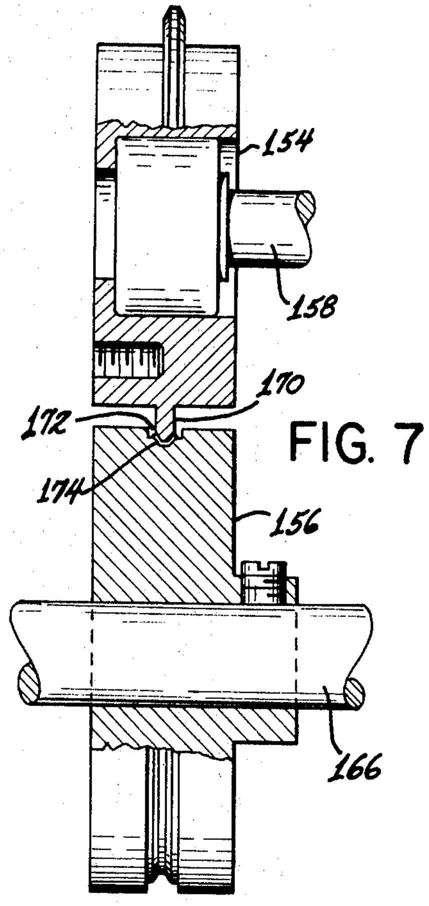
Figure 9:
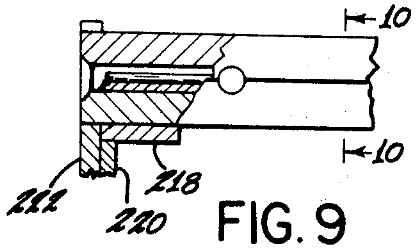

Other objects and advantages of the invention will be apparent from the following description in which certain preferred embodiments of the invention are disclosed. In the drawings which form a part of this application, FIG. 1 is a side view, partially in cross section, of an apparatus embodying the present invention, together with a fragmentary sectional view of a carton shell wrapping machine indexing mechanism which can be used in conjunction with the present invention, FIG. 2 is a top view of the apparatus of the invention shown in FIG. 1, FIG. 3 is an enlarged detailed view of the fragmentary cross sectional view of the carton wrapping machine indexing mechanism shown in FIG. 1, FIG. 4 is an enlarged sectional view of a portion of the apparatus illustrated in FIG. 1, taken along the line 4—4 thereof and looking in the direction of the arrows, FIG. 5 is a side view of another apparatus embodying the invention, FIG. 6 is a top view of the apparatus of FIG. 5, FIG. 7 is a fragmentary, enlarged, sectional view of a portion of the structure illustrated in FIG. 5, taken along the line 7—7 thereof and looking in the direction of the arrows, FIG. 8 is an enlarged view of a portion of the structure illustrated in FIG. 7, FIG. 9 is an enlarged, fragmentary, sectional view of a portion of the structure illustrated in FIG. 6, taken along the line 9—9 thereof and looking in the direction of the arrows, FIG. 10 is an enlarged, sectional view of the structure illustrated in FIG. 9, taken along the line 10—10 thereof and looking in the direction of the arrows.

In the embodiments of the present invention shown, certain elements thereof have been designed for operation in connection with a device for applying a label or wrapper to a carton shell, wherein said label is coated on its bottom or lower side with wet glue and then moved into position above the carton shell, and then said carton is moved upwardly into said label and carries said label with it to cause the label to form around three surfaces of the carton shell. Thereafter, as the label applying device moves to other positions, the label is folded completely around and adhered to the carton shell. Accordingly, the invention will be described with particular reference to the dispensing of measured lengths of tape and applying them to carton shells in connection with applying labels thereto by such a device, sometimes referred to as a "tight wrapper," although it will be recognized that the present invention may be employed, with minor changes, to dispensing tapes for other uses.

Figures 1, 4:
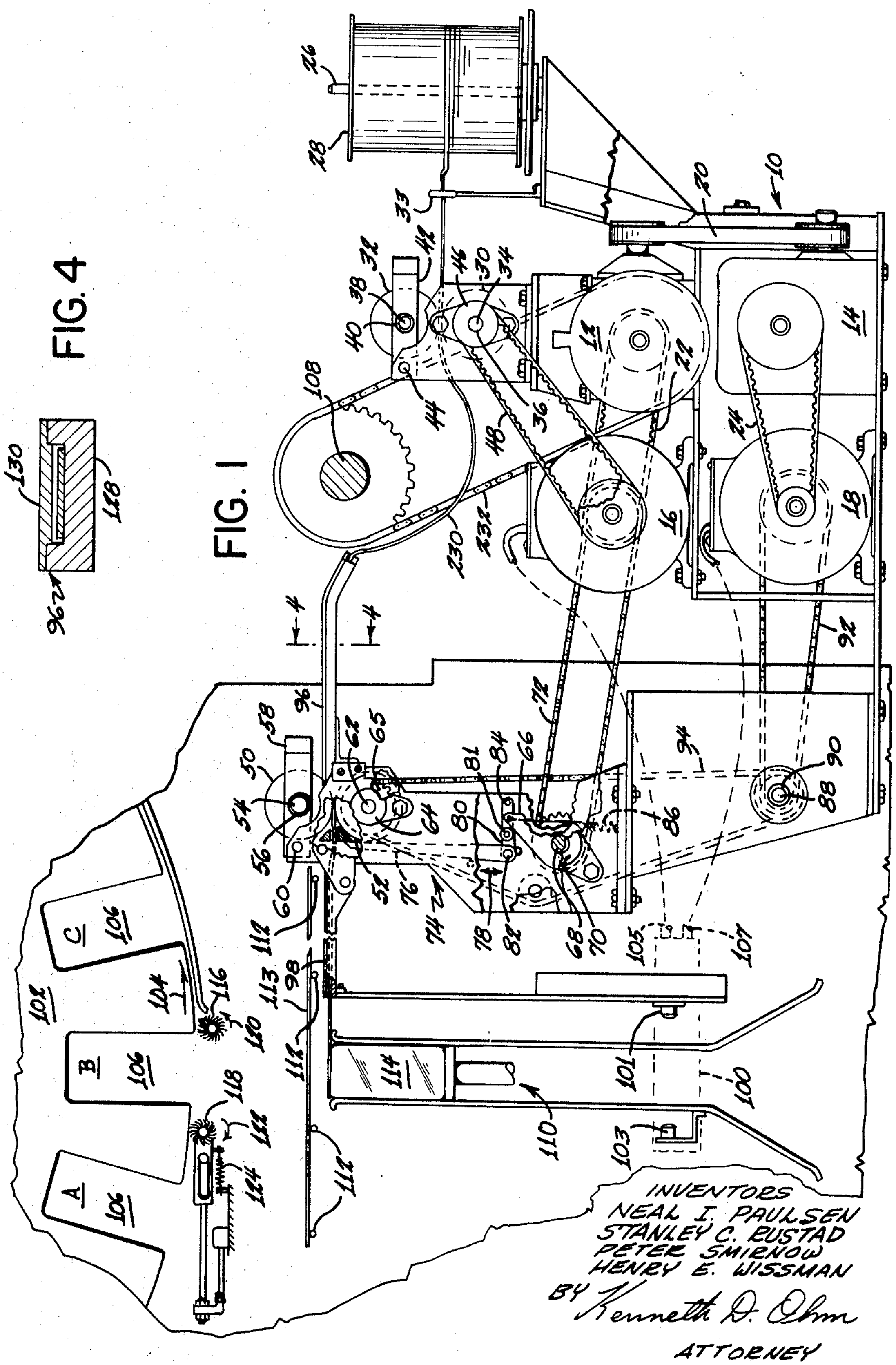

Referring now to FIG. 1, numeral 10 designates a support frame. The frame 10 has mounted thereon a right angle gear box 12, an index drive assembly 14, a first electric clutch brake 16, and a second electric clutch brake 18. The right angle gear box 12 can be any commercially available right angle box which provides a rotary output at right angles to the rotary input thereto, such as a Curtis gear box No. 212A. The index drive assembly 14 can be any commercially available index drive assembly which provides rotary output having only a predetermined portion of the rotation that is applied to its input shaft, such as a Commercial Cam and Machine Company index drive assembly No. B4H–20–180. The first and second electric clutch brakes 16 and 18 can be any commercially available electric clutch brake, such as an Electroid Clutch-Brake No. CB–420 240 in lb. torque.

The rotational output of the right angle gear box 12 is connected to the input of the index drive assembly 14 by means of a rubber drive belt 20. In addition, the input of the right angle gear box 12 is connected to the input of the first electric clutch brake 16 by means of a rubber drive belt 22. The output of the index drive assembly 14 is connected to the input of the second electric clutch brake 18 by means of a rubber drive belt 24.

A vertical spindle shaft 26 about which a tape supply reel 28 rotates is fixedly mounted to the frame 10. A pair of continuously rotating frictional drive wheels 30 and 32 are situated near the tear tape supply reel 28 above the right angle gear box 12. A tape guide 33 is fastened to the frame 10 to guide the tape to the drive wheels 30 and 32 at the desired angle after it is pulled off the supply reel 28. The drive wheel 30 is mounted on a relatively short shaft 34 journaled in a bearing 36 mounted on the support frame 10. The drive wheel 32 is mounted on a relatively short shaft 38 journaled in a bearing 40 mounted in a pivoting member 42. The pivoting member 42 is connected to the frame 10 in such a manner that it can pivot about shaft 44.

The shaft 34 extends outside the bearing 36 and this extension has connected thereto a drive wheel 46. This drive wheel 46 is connected to the output of the first electric clutch brake 16 by means of a rubber drive belt 48.

At the left side of the apparatus, as viewed in FIG. 1, is a pair of intermittently rotating frictional drive wheels 50 and 52. The drive wheel 50 is mounted on a relatively short shaft 54 journaled in a bearing 56 which is mounted in a pivoting member 58. The pivoting member 58 pivots about a shaft 60 mounted on the support frame 10. The intermittently rotating drive wheel 52 is mounted on a relatively short shaft 62 journaled in a bearing 64 which is mounted on the frame 10. The shaft 62 has fixedly mounted thereon a drive sprocket 65.

Below the intermittent drive wheels 50 and 52, the frame 10 supports a cam member 66 which is mounted on a relatively short shaft 68 journaled in a bearing 70 mounted on the frame 10. The cam member 66 is connected to the input of the first electric clutch brake 16 by means of a chain drive 72.

Associated with the cam member 66 is a knife cutting assembly designated generally by the numeral 74. The knife cutting assembly 74 comprises a knife blade 76 adapted to move generally vertically in the directions indicated by the arrow 78, a cam engaging arm 80, a cam follower 81 to provide a smooth rolling action on said cam 66, a pivot pin 82 connecting said knife blade 76 to said cam engaging arm 80, a pivot pin 84 connected to the frame 10 and about which the knife cam engaging arm 80 can pivot, and a spring 86 for biasing the knife assembly in the position shown in FIG. 1.

Below the cam member 66, the frame 10 supports a rotary motion transmitting shaft 88 which is journaled in bearings 90 mounted in the frame 10. The shaft 88 has a pair of drive wheels fixedly mounted thereon. By means of one of these drive wheels the shaft 88 is connected to the output of the second electric clutch brake 18 by means of a chain drive 92. By means of the other said drive wheels, the shaft 88 is connected to the sprocket 65 mounted on shaft 62 by means of a chain drive 94.

Positioned on either side of the intermittently rotating drive wheels 50 and 52 are tape guide tube members 96 and 98. These tape guide members 96 and 98 have a hollow channel therein which is large enough to permit the tape from the supply reel 28 to pass therethrough. Tape guide member 98 serves to direct the tape after it has passed through the wheels 50 and 52 and to hold the tape in position after it has been severed by the knife blade 76.

A photoelectric controll 100 (shown schematically) including a photocell 101 and a light source 103 is electrically connected to the electric clutch brakes 16 and 18 by means of wires 105 and 107, respectively.

At the left of FIG. 1 there is shown, in fragmentary cross section, a portion of a commercial carton shell wrapping machine, sometimes referred to as a "tight wrapper." Such a machine wraps carton shells with precut sheets of overwrap material or labels by feeding sheets of these materials or labels into the wrapping position in movements at a right angle to the direction which the tape must feed for proper orientation with the label and carton shell. A portion of an indexing turret of a tight wrap machine is designated by the numeral 102. When the tight wrap machine is operating, the turret 102 moves in the direction indicated by the arrow 104 one carton pocket 106 position for each full rotation of a shaft 108. For example, for each complete revolution of the shaft 108, a carton pocket 106 moves from the position designated by letter B to the position designated by letter C.

Directly below the carton pocket 106 position designated by letter B is a carton elevator 110. Between the elevator 110 and the turret 102 are wires 112 for holding the labels 113 in place just prior to their being applied to an unwrapped carton shell 114. Positioned on either side of the wrapping station (carton pocket 106 position designated by letter B) is a pair of rotating brushes 116 and 118. These brushes rotate in the directions indicated by arrows 120 and 122, respectively. The brush 118 is held in the position shown by bias spring 124 and is made to move horizontally from its present position approximately halfway across the wrapping station (106–B) by use of pneumatic pressure when desired.

As shown in FIG. 4, the tape guide 96 is comprised of two members 128 and 130. The member 128 has a recess cut therein adapted to permit the tape to move therealong, while the member 130 is a piece which projects slightly into the recess cut in the member 128 in such a manner as to prevent a crack which might catch the tape. The member 130 is held in place on the member 128 by any well-known means, such as clamping. The tape guide 98 can be made like the guide 96.

Referring to FIG. 5, numeral 10' designates a support frame for a modified form of the present invention shown in FIG. 1. The frame 10' has mounted thereon a right angle gear box 132, an index drive assembly 134, and an electric clutch brake 136. The right angle gear box 132 is similar to the right angle gear box 12 of FIG. 1. The index drive assembly 134 is similar to the index drive assembly 14 of FIG. 1. The electric clutch brake 136 is similar to electric clutch brakes 16 and 18 of FIG. 1.

One rotational output of the right angle gear box 132 is connected to the input of the cam index drive 134 by means of a drive chain 138. The output of the index drive 134 is connected to the input of the electric clutch brake 136 by means of a drive chain 140.

Positioned above the electric clutch brake 136 is a drive drum 142. The drive drum 142 is fixedly mounted on a relatively short shaft 144 journaled in a bearing 146 mounted on the support frame 10'. The shaft 144 has fixedly mounted thereon a drive sprocket 145. The output of the electric clutch brake 136 is connected to sprocket 145 by means of a drive chain 147. Above the drive drum 142 and in frictional engagement therewith is a tape supply reel 148. The tape supply reel 148 is mounted on a relatively short shaft 150 which can move up and down in the slots 152 of the frame 10'.

At the left side of the apparatus, as viewed in FIG. 5, is a pair of intermittently rotating frictional drive wheels 154 and 156. The drive wheel 154 is mounted on a relatively short shaft 158 journaled in a bearing 160 which is mounted on a pivoting member 162. The pivoting member 162 pivots about a shaft 164 mounted on the support frame 10'. The intermittently rotating drive wheel 156 is mounted on a relatively short shaft 166 journaled in a bearing 168 which is mounted in the frame 10'. The shaft 166 has fixedly mounted thereon a drive sprocket 169. A spring 171 holds the pivoting member 162 down so that the drive surface of the drive wheel 154 is held in close proximity to the drive surface of the drive wheel 156.

As shown in detail in FIGS. 7 and 8, the drive wheel 154 is provided with a raised portion or circular flange 170 about its periphery while the drive wheel 156 is provided with a groove 172 about its periphery. In FIGS. 7 and 8, the numeral 174 denotes a cross section of a portion of the tear tape passing between the wheels 154 and 156. As shown in FIGS. 7 and 8, the portion of the tear tape which passes between the wheels 154 and 156 is pressed into the groove 172 by the flange 170 and assumes a concave shape when viewed from above. The tape is formed of material to permit it to retain this concave position for at least a short time.

Below the intermittent drive wheels 154 and 156, the frame 10' supports a cam member 176 which is mounted on a relatively short shaft 178 journaled in a bearing 180 mounted on the frame 10'. The cam member 176 is connected to one output of the right angle gear box 132 by means of a chain drive 182.

Associated with the cam member 176 is a knife cutting assembly designated generally by the numeral 184. The knife cutting assembly 184 comprises a knife blade 186 adapted to move generally vertically in the directions indicated by the arrow 188, a cam engaging arm 190, a cam follower 191 to provide a smooth rolling action on said cam 176, a pivot pin 192 connecting said knife blade 186 to said cam engaging arm 190, a pivot pin 194 connected to the frame 10' and about which said knife cam engaging arm 190 can pivot, and a spring 196 for biasing the knife assembly in the position shown in FIG. 5.

Below the cam member 176, the frame 10' supports a rotary motion transmitting shaft 198 which is journaled in bearings 200 mounted in the frame 10'. The shaft 198 has a pair of drive wheels fixedly mounted thereon. By means of one of these drive wheels the shaft 198 is connected to one of the outputs of the electric clutch brake 136 by means of a chain drive 202. By means of the other said drive wheel, the shaft 198 is connected to the drive sprocket 169 mounted on shaft 166 by means of a chain drive 204.

Positioned on the right side of the intermittently rotating drive wheels 154 and 156 are tape guide members 208 and 210. These tape guide members 208 and 210 have openings therein which are large enough to permit the tape from the supply reel 148 to pass therethrough. On the right hand side of the intermittently rotating drive wheels 154 and 156 is a tape guide tube 212. The guide member 212 has a hollow channel therein which is large enough to permit the tape from the supply reel to pass therethrough and retain its concave curvature which it received from the drive wheels 154 and 156. The tape guide member 212 serves to direct the tape after it has passed through the wheels 154 and 156 and to hold the tape in position after it has been severed by the knife blade 186.

A photoelectric control 213 (shown schematically) including a photocell 215 and a light source 217 is electrically connected to electric clutch brake 136 by means of wires 219.

As shown in FIG. 10, the tape guide tube member 212 is comprised of two parts 214 and 216. The member 214 has a recess cut therein adapted to permit the tape to move therealong while retaining the concave curvature it received from the wheels 154 and 156, while the member 216 has a portion which projects slightly into the recess cut in the member 214 in such a manner as to prevent a crack which might catch the tape. In addition, the member 216 has extending edges which engage the outside of the member 214. The member 216 is held in place on the member 214 by any well-known means, such as clamping.

As shown in FIG. 9, the tube guide member 212 has a key 218 extending from the bottom thereof which mates with an opening provided in member 220 affixed to one side 222 of a carton elevator, such as designated by numeral 110 of FIG. 1. This key 218 and its associated opening 220 permit the guide member 212 to be positioned accurately with relation to any package, such as 114 of FIG. 1, inserted in a carton elevator, such as 110, of a carton shell "tight wrapper" machine.

In the normal tight wrapper operation, a sheet of wrapping material or label 113 (FIGS. 1 and 3) is coated with wet glue on its bottom or lower side and is moved into wrapping position on thin wires 112. When the label reaches the wrapping position (designated by numeral 224 of FIG. 3), it is suspended there on the wires 112 above the carton elevator 110 and beneath the empty carton pocket 106–B. Then an unwrapped carton shell, such as 114, is plunged vertically upward into the carton pocket 106–B, carrying the label 113 with it. At this point the label 113 has formed around and adhered to three faces 114–1, 114–2 and 114–3 of the carton shell 114. Then the brush 118 moves to the right and forms and adheres another portion of the label 113 to face 114–4 of the carton shell 114. The turret 102 then moves the carton shell 114 to 106–C. So doing causes the brush 120 to form and adhere more of the label 113 as shown to face 114–4 of the carton shell 114. Thereafter, the pocket 106–C, on the turret 102, is indexed through other positions where the label 113 is folded or wrapped completely around the carton shell 114.

The apparatus of the present invention has been developed to insert a predetermined measured length of tape 226 between the label 113 and the carton shell 114 and to result in this tape being wrapped around the carton shell 114 simultaneously with the label and with a short end 228 projecting through the seam where the label ends overlap. The apparatus of the present invention accomplishes this by moving tape into the tight wrapping machine through a tape guide tube 98 with about the same timing as the label 113. The tape is then stopped, cut to length, and is suspended with one end projecting from the guide tube 98 across the carton shell 114 path from the carton elevator 110 to the carton pocket 106–B directly beneath the label 113. The carton shell 114 moving vertically upward first contacts the tape 226, then the label 113, and carries both into the carton pocket 106–B simultaneously. Subsequent operations of the tight wrapper are the same as explained above, except that the tape 226 is folded or wrapped around the carton 114 with the label 113. The projection 228 of one end of the tape 226 from beneath the label 113 is achieved by initially cutting and positioning that end of the tape the proper distance beyond the label edge. It is important to position the tape guide tube 98 as near to the bottom side of the label 113 as possible so that the carton shell 114 will push the free end of the tape 226 (i.e. the end of the tape 226 positioned across the carton elevator 110) into contact with the glued surface of the label as quickly as possible and minimize slip between the tape and the label.

The apparatus shown in FIG. 1 controls the tape cut off length, such as the length of the piece of tape 226, by the diameter and rotational speed of the continuously rotating drive wheels 30, 32 and of the intermittently rotating drive wheels 50, 52. For each wrapping cycle of a carton shell by a "tight wrapper" machine, the exact length of tape desired, such as the length of the piece of tape 226, is fed into the tape guide member 98, cut off by the knife blade 76, and suspended in position in the tape guide member 98 for pickup by the carton shell. As the continuously rotating drive wheels 30, 32 pull tape off of the supply reel 28 and the intermittently rotating drive wheels 50, 52 feed tape into the guide member 98, a loop 230 of the tape alternately builds up and is used between the continuously rotating drive wheels 30, 32 and the intermittently rotating drive wheels 50, 52. The intermittently rotating drive wheels 50, 52 are sized to feed slightly more tape for each wrapping cycle (about $\frac{1}{32}$ to $\frac{1}{16}$ inch) than the continuous drive wheels 30, 32 pull off of the tape supply reel 28. The result is a very slight slip on the tape at the end of each movement of the intermittently rotating drive wheels 50, 52. This assures that the loop 230 of the tape does not gradually lengthen. Moreover, if the tape has been initially threaded with a large loop 230 between the two pairs of rolls, 30, 32 and 50, 52, such loop will gradually shorten until it reaches its minimum length and then the slight slip at the end of each intermittent rotation of the wheels 50, 52 will begin.

The use of a commercially available index drive assembly 14 to drive the intermittently rotating drive wheels 50 and 52 results in a very smooth delivery of the tape to the tape guide 98 and a controlled, slow movement of said drive wheels near the end of each cycle when a tape slip occurs. As previously mentioned, the shaft 108 is synchronized with the movement of the indexing turret 102 so that each time a carton pocket 106 moves from position B to position C, the shaft 108 makes one complete revolution. This movement of the shaft 108 is transmitted by means of a rubber drive belt 232 to the input of the right angle gear box 12. The output of the right angle gear box 12, which is directly proportional to its input, drives the input of the index drive assembly 14 through belt 20. In addition, the input of the first electric clutch brake 16 is driven by the belt 22 in proportion to the input of the right angle gear box 12.

The first electric clutch brake 16 output in turn drives the continuously rotating drive wheels 30 and 32 by means of drive belt 48 and sprocket 46. Whenever the shaft 108 rotates while the clutch portion of the electric clutch brake 16 is energized, the drive wheels 30 and 32 will continuously pull tape from the supply reel 28 to form the loop 230 of tape. The clutch portion of the electric clutch brake 16 is energized, except when the photoelectric control 100 de-energizes it and energizes the brake portion of said electric clutch brake.

Simultaneously with the driving of the continuously rotating drive wheels 30 and 32, the second electric clutch brake 18, when the clutch portion thereof is energized, transmits the intermittent rotary motion it receives from the output of the index drive assembly 14 to the intermittently rotating drive wheels 50 and 52. The clutch portion of the electric clutch brake 18 is energized, except when the photoelectric control 100 de-energizes it and energizes the brake portion of said electric clutch brake. As previously mentioned, since the output of the index drive assembly 14 provides only a part of a revolution for each whole revolution of input it receives, its output is inherently intermittent. This intermittent output causes the wheels 50 and 52 to feed the desired length of tape into the tape guide 98 and to stop the feeding of tape at the desired time so it can be cut by the knife blade 76.

The knife blade 76 is driven at the desired time by the cam 66 which in turn is driven in synchronism with the input to the first electric clutch brake 16. The cam 66 is so positioned that it will drive the knife blade 76 up into the tape only after the intermittent output of the index drive assembly 14 for a given tape feeding cycle has ceased. That is, only after the desired length of tape has been feed into the tape guide 98.

The photocell 101 of the photoelectric control 100 senses the presence or absence of a carton shell, like 114, ready to accept a piece of tape, such as tape 226, each time the frictional drive wheels 50 and 52 are ready to dispense a length of tape like 226 into the tape guide 98. If there is no carton shell sensed as being ready to accept such a piece of tape, the photoelectric control 100 simultaneously energizes the brake portions and de-energizes the clutch portions of both of the electric clutch brakes 16 and 18. When this occurs, the electric clutch brakes 16 and 18 will not provide any rotational output and therefore no tape will be fed by the drive wheels 30 and 32 into the loop 230 and no tape will be fed by the drive wheels 50 and 52 from the loop 230 into the tape guide member 98.

The apparatus shown in FIG. 5 controls the tape cut off length, such as the length of the piece of tape 226 shown in FIG. 3, by the diameter and rotational speed of the drive drum 142 and of the intermittently rotating drive wheels 154 and 156. For each wrapping cycle of a carton shell by a "tight-wrapper" machine, the exact length of tape desired, such as the length of the tape 226, is fed into the tape guide tube member 212, cut off by the knife blade 186, and suspended in position in the tape guide tube member 212 for pickup by the carton shell.

As tape is driven off of the supply reel 148 by the drive drum 142 and is fed to the tape guide member 212 by the intermittently rotating drive wheels 154 and 156, a loop 234 of tape remains relatively constant or taut. That is, the loop 234 is not alternately built up and used. This occurs because the surface travel of the drum 142, upon which the tape supply reel 148 rests, is approximately equal to that of the wheels 154, 156 and the fact that said drum and wheels are driven by the output of the electric clutch brake 136. This tends to drive equal amounts of tape from the supply reel 148 and through the wheels 154, 156. In practice the intermittently rotating drive wheels 154 and 156 are sized to feed slightly more tape for each wrapping cycle (about $\frac{1}{32}$ to $\frac{1}{16}$ inch) than the drive drum 142 feeds. The result is a very slight slip between the tape reel 148 and the drive drum 142 at the end of each movement of the intermittently rotating drive wheels 154 and 156. This allows the wheels 154, 156 to pull extra tape from the reel 148 and tends to keep the loop 234 taut. This assures that the loop 234' of the tape does not gradually lengthen. Moreover, if the tape has been initially threaded with a large loop 234 between the drive drum 142 and the intermittently rotating drive wheels 154, 156, such loop will gradually shorten until it reaches its minimum length and then the slight slip at the end of each intermittent rotation of the wheels 154, 156 will begin.

The use of a commercially available index drive assembly 134 to drive the intermittently rotating drive wheels 154 and 156 results in a very smooth delivery of the tape to the tape guide 212 and a controlled, slow movement of said drive wheels near the end of each cycle when a tape slip occurs. As previously mentioned in connection with the description of FIG. 1, the shaft 108 is synchronized with the movement of the indexing turret 102 so each time a carton pocket 106 moves from position B to position C, the shaft 108 makes one complete revolution. This movement of the shaft 108 is transmitted by means of a chain drive 236 to the input of the right angle gear box 132.

The output of the right angle gear box 132, which is directly proportional to the aforementioned input thereto, drives the input of the index drive assembly 134 through a chain 138. The intermittent rotary output of the index drive assembly 134 is transmitted to the input of the electric clutch brake 136 by drive chain 140. As previously mentioned, since the output of the index drive assembly 134 provides only a part of a revolution for each whole revolution of input it receives, its output is inherently intermittent. This intermittent output causes the electric clutch brake 136 to also have an intermittent output. The intermittent output of the electric clutch brake 136 is directly proportional to the output of the index drive assembly 134 whenever the clutch portion of said clutch brake is energized. The clutch portion of the electric clutch brake 136 is energized, except when the photoelectric control 100 de-energizes it and energizes the brake portion of said electric clutch brake.

The intermittent output of the electric clutch brake 136 is simultaneously fed to the drive drum 142 by means of the drive chain 147 and to the intermittently rotating drive wheels 154 and 156 through drive chains 202 and 204. Thus, the drive drum 142 only drives tape from the supply reel 148 while the wheels 154 and 156 feed tape into the tape guide 212. The intermittent driving of the drum 142 and the wheels 154, 156 causes the desired length of tape to be fed into the tape guide 212 and the feeding of tape to stop at the desired time so the tape can be cut by the knife blade 186.

The knife blade 186 is driven by the cam 176 in synchronism with the input to the right angle gear box 132. The cam 176 is so positioned that it will drive the knife blade 186 up into the tape only after the intermittent output of the index drive assembly 134 for a given tape feeding cycle has ceased. That is, only after the desired length of tape has been fed into the tape guide 212.

The photocell 215 of the photoelectric control 213 senses the presence or absence of a carton shell, like 114, ready to accept a piece of tape, such as tape 226, each time the frictional drive wheels 154 and 156 are ready to dispense a length of tape like 226 into the tape guide 212. If there is no carton shell sensed as being ready to accept such a piece of tape, the photoelectric control 213 energizes the brake portion and de-energizes the clutch portion of the electric clutch brake 136. When this occurs, the electric clutch brake 136 will not transmit any rotational output to either the drive drum 142 or the intermittent drive wheels 154, 156. Therefore, when the clutch portion of the electric clutch brake 136 is de-energized, no tape will be fed by the drive drum 142 into the loop 234 and no tape will be fed by the drive wheels 154, 156 from the loop 234 into the tape guide member 212.

In view of the principles set forth herein, we have shown some of the ways of carrying out the present invention and some of the equivalents which are suggested by these disclosures.

Now, therefore, we claim:

1. An apparatus for dispensing predetermined lengths of strip material at regular timed intervals for use with a device which moves an item through a receiving station for each such regular time interval comprising drive means for imparting a concave curvature to said strip material and for feeding said concaved shaped strip material to said item receiving station where such a predetermined length thereof can be picked up by said item, said drive means being synchronized with said item moving device to only feed such a predetermined length of such material to said receiving station (1) when the item which was just previously in said receiving station has been moved by said moving device from any position where said just moved item would interfere with the feeding of said material to said item receiving station, and (2) when an item to use such a length of material is in a position selected from the group of possible positions said moving device moves it through consisting of (a) the actual position the item would be in to receive said predetermined length of material, and (b) any position the item to receive said predetermined length of material would be in while moving into said actual position, and knife means for cutting said material immediately after said drive means has fed such a predetermined length of said material to said receiving station.

2. An apparatus for dispensing predetermined lengths of a material at regular timed intervals as called for in claim 1 including means for guiding and holding each cut off predetermined length of material at said receiving station prior to said predetermined length of material being picked up.

3. An apparatus for dispensing predetermined lengths of a material at regular timed intervals as called for in claim 1 including means for sensing the presence and absence of an item in any of said group of possible positions said moving device moves an item through, said sensing means sending a signal to said drive means when it senses the absence of an item from all of said possible positions, and said drive mean having means for stopping the feeding of said material upon receipt of said signal.

4. An apparatus for dispensing predetermined lengths of a material at regular timed intervals as called for in claim 3 wherein said sensing means has a photoelectric control having a light source and a photocell, said photocell actually sensing said presence and absence of an item and causing said signal to be sent by the photoelectric control to said drive means.

5. An apparatus for dispensing predetermined lengths of material at regular timed intervals as set forth in claim 1 including a supply reel of said strip material, said drive means having a first friction drive means to feed said material to said receiving station, said first friction drive means having one wheel with a circumferential groove therein adapted to receive said strip material, and having another wheel, and a circumferential flange on said another wheel adapted to fit into said groove to thereby force said strip material into said groove and assume a concave shape prior to being fed into said receiving station.

6. An apparatus for dispensing predetermined lengths of material at regular timed intervals as set forth in claim 1 including a supply reel of said strip material, said drive means having a first friction drive means having a pair of continuously rotating friction drive wheels, and having a second friction drive means having a pair of intermittently rotating friction drive wheels, and means for rotating said intermittently rotating wheels only when an item is in any of said group of possible positions said moving device moves an item through.

7. An apparatus for dispensing predetermined lengths of material at regular timed intervals as called for in claim 1 including a supply reel of said strip material, said drive means having a first friction drive means having a drum means upon which said supply reel rests and by which said supply wheel is rotated, said drive means having a second friction drive means having a pair of intermittently rotating friction drive wheels, and means for rotating said drum and said wheels only when an item is in any of said group of possible positions said moving device moves an item through.

8. An apparatus for dispensing predetermined lengths of material at regular timed intervals as called for in claim 1 wherein said drive means includes an index drive assembly having an input and an output, said input being driven in synchronism with the item moving device and being directly proportional to said regular time interval it takes said item moving device to move each item through said receiving station, a clutch brake means having its input connected to the output of said index drive assembly and having its output connected to cause said feeding of such material to said receiving station, and means for sensing the presence and absence of an item in any of said group of possible positions said item moving device moves an item through, said sensing means sending a signal to said clutch brake means upon sensing the absence of an item from all of said possible positions, said clutch brake means stopping its output upon receipt of said signal.

9. An apparatus for dispensing predetermined lengths of material at regular timed intervals as called for in claim 1 including a supply reel of said strip material, means for guiding and holding each cut off predetermined length of said material at said receiving station prior to said predetermined length of material being picked up, means to feed said strip material to said guiding and holding means, said drive means only feeding said strip material to said receiving station during a predetermined portion of said regular time interval it takes said item moving device to move each item through said receiving station, and means for sensing the presence and absence of an item in any of said group of possible positions said moving device moves an item through, said sensing means sending a signal to said drive means when it senses the absence of an item from all of said possible positions, said drive means stopping the feeding of said material upon receipt of said signal.

10. An apparatus for dispensing predetermined lengths of strip material at regular timed intervals for use with a device which moves an item along a first predetermined path through a receiving station for each such regular time interval comprising drive means for feeding said strip material along a second predetermined path to an item receiving station where such a predetermined length of material can be picked up by said item, said second predetermined path intersecting said first predetermined path, said drive means being synchronized with said item moving device to only feed such a predetermined length of such material to said receiving station when an item being moved by said item moving device is absent from said intersection of said first and second predetermined paths, and knife means for cutting said material immediately after said drive means has fed such a predetermined length of said material to said receiving station.

11. An apparatus for dispensing predetermined lengths of strip material at regular timed intervals as called for in claim 10 wherein said drive means moves said item through a number of positions along said first predetermined path prior to moving said item into the receiving station, and means for sensing the presence and absence of an item in at least one of said positions preceding said receiving station, said sensing means adapted to send a signal to said drive means when it senses the absence of a package in said one position, and said drive means having means for stopping the feeding of said strip material upon receipt of said signal.

12. An apparatus for dispensing predetermined lengths of strip material at regular timed intervals as called for in claim 10 wherein said drive means only feeds said strip material into said receiving station during a predetermined portion of the regular time interval it takes said item moving device to move each item through said receiving station.

13. An apparatus for dispensing predetermined lengths of strip material at regular timed intervals as called for in claim 10 including a supply reel of said strip material, means for guiding and holding each cut off predetermined length of said material at said receiving station prior to said predetermined length of material being picked up with one end thereof extending into said first predetermined path, said drive means having means to feed said strip material to said guiding and holding means, said drive means only feeding said strip material to said receiving station during a predetermined portion of said regular time interval it takes said item moving device to move each item through said receiving station, and means for sensing the presence and absence of an item in any of the positions along said first predetermined path said moving device moves an item through prior to reaching said receiving station, said sensing means sending a signal to said drive means upon sensing the absence of an item from all of said positions, said drive means stopping the feeding of said material upon receipt of said signal.

14. In combination with a machine which moves a package through a series of positions, including a receiving station position, at regular timed intervals, an apparatus for dispensing predetermined lengths of strip material for each such regular time interval it takes to move a package through said receiving station comprising drive means for feeding a predetermined length of said strip material into said receiving station position with about the same timing as said machine moves a package into said receiving station position and for stopping said feeding of said strip material prior to said package being moved out of said receiving station position, and knife means for cutting said material immediately after said feeding thereof has stopped and prior to said package moving out of said receiving station.

15. An apparatus as called for in claim 14 including means for sensing the presence and absence of a package in at least one of said positions preceding said receiving station position, said sensing means adapted to send a signal to said drive means when it senses the absence of a package in said one position, and said drive means having means for stopping the feeding of said strip material upon receipt of said signal.

16. An apparatus as called for in claim 14 wherein said drive means only feeds said strip material into said receiving station during a predetermined portion of the regular time interval it takes said package moving device to move each package through said receiving station.

17. An apparatus as called for in claim 16 including a supply reel of said strip material, means for guiding and holding each cut off predetermined length of said material at said receiving station prior to said predetermined length of material being picked up, said drive means having means to feed said strip material to said guiding and holding means, and means for sensing the presence and absence of a package in at least one of said positions preceding said receiving station position, said sensing means adapted to send a signal to said drive means when it senses the absence of a package in said one position, and said drive means having means for stopping the feeding of said strip material upon receipt of said signal.

18. An apparatus for dispensing predetermined lengths of strip material at regular timed intervals for use with a device which moves an item through a receiving station for each such regular time interval comprising a supply reel of said strip material, drive means for feeding said strip material to said item receiving station where such a predetermined length thereof can be picked up by said item, said drive means having a first friction drive means to cause the removal of said material from said supply reel, and having a second friction drive means to feed said material to said receiving station, said second friction drive means having one wheel with a circumferential groove therein adapted to receive said strip material, and having another wheel, and a circumferential flange on said another wheel adapted to fit into said groove to thereby force said strip material into said groove and assume a concave shape prior to being fed into said receiving station, said drive means being synchronized with said item moving device to only feed such a predetermined length of such material to said receiving station (1) when the item which was just previously in said receiving station has been moved by said moving device from any position where said just moved item would interfere with the feeding of said material to said item receiving station, and (2) when an item to use such a length of material is in a position selected from the group of possible positions said moving device moves it through consisting of (a) the actual position the item would be in to receive said predetermined length of material, and (b) any position the item to receive said predetermined length of material would be in while moving into said actual position, and knife means for cutting said material immediately after said drive means has fed such a predetermined length of said material to said receiving station.

References Cited

UNITED STATES PATENTS 2,542,282 2/1951 Lissimore ---------- 156—368
3,140,214 7/1964 Von Hofe ---------- 156—368

SAMUEL FEINBERG, Primary Examiner

U.S. Cl. X.R.

156—368